H. H. Robertson,
Fly Trap,

Nº 29,008. Patented July 3, 1860.

Witnesses:
Goodwin H. ArLee
Robt W. Fenwick

Inventor
H. H. Robertson

UNITED STATES PATENT OFFICE.

HENRY H. ROBERTSON, OF KINGSTON, MISSOURI.

FLY-TRAP.

Specification of Letters Patent No. 29,008, dated July 3, 1860.

*To all whom it may concern:*

Be it known that I, HENRY H. ROBERTSON, of Kingston, in the county of Caldwell and State of Missouri, have invented a new and useful Improvement in Fly-Traps; and I do hereby declare that the following is a full, clear, and exact description of the same, reference being had to the accompanying drawings, forming a part of this specification, in which—

Figure 2:
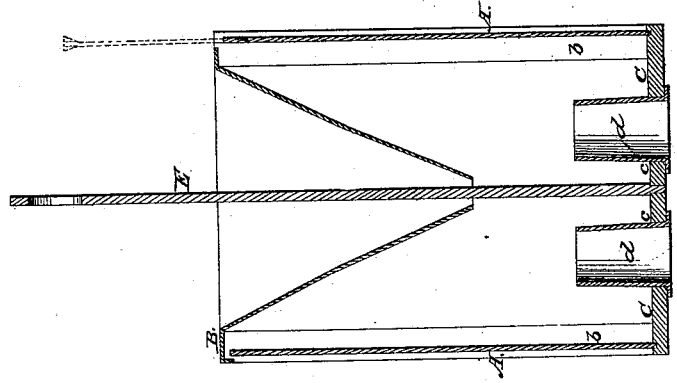
Figure 1:
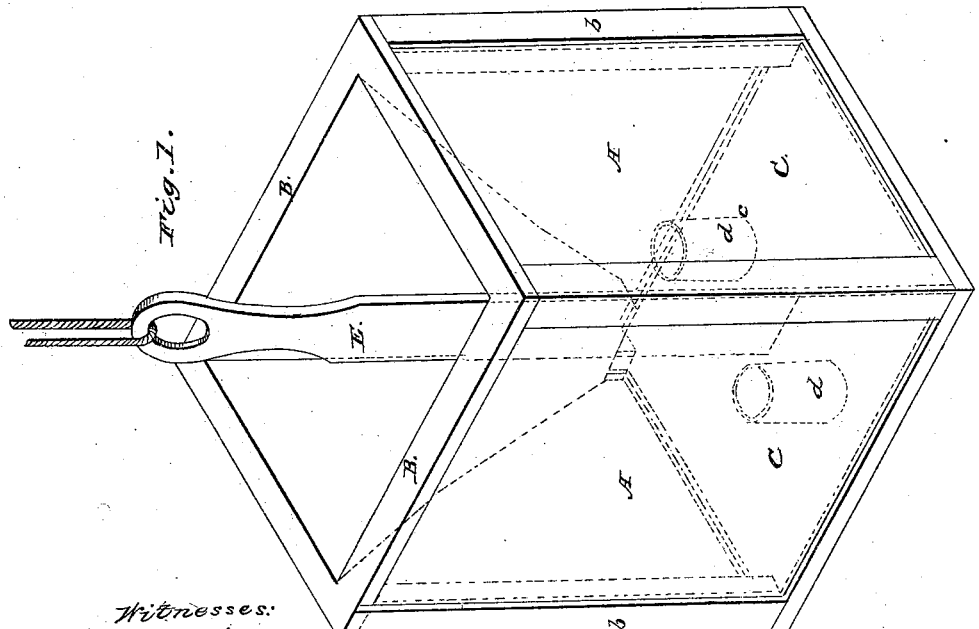

Figure 1 is a perspective view, and Fig. 2, a vertical transverse section of my improved fly-trap.

Similar letters of reference, in each of the several figures, indicate corresponding parts.

My invention consists in the employment of a vertical suspension standard, in combination with a case having an opaque funnel shaped fly entrance passage at its top and tubular opaque fly entrance passages at its bottom, in the manner and for the purpose hereinafter described.

To enable others, skilled in the art, to make and use my invention, I will proceed to describe its construction and operation.

A, represents a rectangular box formed of panes of glass and narrow corner strips $b$, of wood, said strips being grooved to admit the panes of glass, and retain them in place.

The top B, of the case is similar in form to an inverted hollow truncated pyramid and is painted black both on its inside and outside. The upper and lower ends of the top B, are left open, as shown. The top B, is constructed so as to fit over the upper edges of three of the panes of glass and thus confine them in place. The other pane is left uncovered so that it may be raised and lowered and thus serve as a door. It will also be seen that the top B, extends down into the case a considerable distance, and thus the entrance passage is carried down far below the top edge of the case. By this arrangement, the flies are not so likely to get out of the trap, for they fly upward as soon as they become entrapped and thus get between the sides of the inverted pyramidical top and the glass sides where they generally remain buzzing around.

The bottom C, of the box or case is flat and has two passages $c$, $c$, formed in it. Into these passages, tubes $d$, $d$, are inserted, said tubes being painted black and extending some distance above the inner side of the bottom C, as shown, so that the flies cannot readily crawl out after they once enter the trap.

E, is a vertical flat standard projecting up from the bottom of the case A, and passing out through the center of the top B, as shown. This standard has a hole in its upper end for a cord, by which to suspend the trap, to pass through, as shown.

The operation is as follows: Raise the glass door and place some condiment attractive to flies on the bottom of the case A, and also on the surface of the standard E. Now suspend the trap by a cord in any suitable place. Thus suspended, the flies will have a chance to enter the trap both at top and bottom. The flies in entering the trap pass down on the central standard through the passage of the pyramidical top and up through the tubular opening at the bottom. Shortly after the flies enter the case and have tasted of the sweets, they become attracted by the light admitted through the glass sides of the case and fly from off the standard toward the same. This flight of fancy seals their fate, for experience has shown that they seldom ever find their way out of the trap after they once get into it; this is owing to the fact of the place at which they entered being very dark, and they never seek to escape in that direction, but following the teachings of their instinct, seek to escape through the transparent sides of the trap, which admit a flood of light.

What I claim as my invention and desire to secure by Letters Patent, is—

The employment of a vertical suspension standard in combination with a case having an opaque funnel shaped fly entrance passage at its top and tubular opaque fly entrance passages at its bottom, substantially as and for the purposes set forth.

The above specification of my improvement in fly traps, signed by me this 9th day of June 1860.

H. H. ROBERTSON.

Witnesses:
   GOODWIN Y. AT LEE,
   WM. H. BRERETON.